(12) United States Patent
Lervik et al.

(10) Patent No.: US 11,799,974 B2
(45) Date of Patent: Oct. 24, 2023

(54) USER PROFILE AGGREGATION AND INFERENCE GENERATION

(71) Applicant: Microsoft Technology Licensing, LLC, Redmond, WA (US)

(72) Inventors: Bernt Lervik, Oslo (NO); Christopher Mitchell, Oslo (NO); Harald Liavaag, Oslo (NO); Kevin Bellinger, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 162 days.

(21) Appl. No.: 15/692,315

(22) Filed: Aug. 31, 2017

(65) Prior Publication Data
US 2019/0068747 A1 Feb. 28, 2019

(51) Int. Cl.
| | | |
|---|---|---|
| *H04L 67/306* | (2022.01) | |
| *G06F 16/9535* | (2019.01) | |
| *H04L 67/50* | (2022.01) | |
| *H04L 67/025* | (2022.01) | |
| *H04L 67/00* | (2022.01) | |

(52) U.S. Cl.
CPC ........ *H04L 67/306* (2013.01); *G06F 16/9535* (2019.01); *H04L 67/535* (2022.05); *H04L 67/025* (2013.01); *H04L 67/34* (2013.01)

(58) Field of Classification Search
CPC ....... H04L 67/306; H04L 67/22; H04L 67/34; H04L 67/025; G06F 16/9535
USPC .......................................................... 709/206
See application file for complete search history.

(56) References Cited

U.S. PATENT DOCUMENTS

| | | | | |
|---|---|---|---|---|
| 6,496,855 B1* | 12/2002 | Hunt | ............ | G06F 21/31 |
| | | | | 726/8 |
| 2005/0060532 A1* | 3/2005 | Dorenbosch | ...... | H04M 1/72448 |
| | | | | 709/200 |
| 2005/0193093 A1* | 9/2005 | Mathew | ............ | H04L 67/306 |
| | | | | 709/219 |
| 2008/0301166 A1* | 12/2008 | Sugiyama | ............ | G06Q 30/02 |
| | | | | 707/999.102 |

(Continued)

FOREIGN PATENT DOCUMENTS

WO    WO-2014038925 A1 * 3/2014 ............. G06F 21/41

OTHER PUBLICATIONS

"International Search Report And Written Opinion Issued In PCT Application No. PCT/US2018/036170", dated Sep. 12, 2018, 11 Pages.

*Primary Examiner* — Caroline H Jahnige
(74) *Attorney, Agent, or Firm* — Holzer Patel Drennan

(57) ABSTRACT

Examples of the present disclosure describe systems and methods for user profile aggregation and inference generation. In an example, user profiles for a plurality of services may be stored by a unified profile service. An inferred user profile may be generated for a user, which may be used to provide inferred user information for inclusion in a new user profile. Accordingly, the user may not need to reenter information that may already be stored by the unified profile service. The inferred user profile may be generated based on one or more confidence levels in order to determine which user information is most likely to be accurate. In some examples, a user may update aspects of an inferred user profile and may indicate that the update should be incorporated into other user profiles stored by the unified profile service.

20 Claims, 11 Drawing Sheets

(56) References Cited

U.S. PATENT DOCUMENTS

| | | | |
|---|---|---|---|
| 2009/0083367 A1* | 3/2009 | Li | G06Q 30/02 |
| | | | 709/202 |
| 2011/0225048 A1* | 9/2011 | Nair | G06Q 50/01 |
| | | | 705/14.66 |
| 2013/0054433 A1 | 2/2013 | Giard et al. | |
| 2014/0122987 A1* | 5/2014 | Eigner | G06Q 30/0204 |
| | | | 715/224 |
| 2014/0173697 A1 | 6/2014 | Barbir | |
| 2015/0019547 A1* | 1/2015 | Thalapathy | G06F 16/9535 |
| | | | 707/732 |
| 2015/0169336 A1* | 6/2015 | Harper | G10L 15/22 |
| | | | 715/706 |
| 2015/0256557 A1* | 9/2015 | Wong | H04L 67/306 |
| | | | 726/6 |
| 2016/0147758 A1 | 5/2016 | Chhaya et al. | |
| 2017/0091260 A1* | 3/2017 | Henocque | G06F 3/0481 |
| 2020/0177702 A1* | 6/2020 | Young | G06Q 50/01 |

* cited by examiner

440

USERNAME: [      ]

PHONE NUMBER: [+1 (555) 172-3749 ⊗][▽] ←442

ADDRESS: [2001 PINEHURST DRIV⊗][▽] ←444

EMAIL ADDRESS: [HBOYD@EXAMPLE.CO⊗][▽] ←446

( CREATE PROFILE )

USERNAME: [      ]

UPDATE OTHER PROFILES?

464→ ☑ SOCIAL NETWORK
466→ ☐ GAME SERVICE
468→ ☐ VIDEO CALL SERVICE ( CANCEL )   ( SUBMIT )

USER PROFILE AGGREGATION AND INFERENCE GENERATION

BACKGROUND

A user may use a user device to access a variety of services, each of which may have a user profile associated with the user. However, in order to establish a user profile at each or the services, the user may reenter information that may already have been provided to other services. Further, information associated with the user may change, causing information stored by the user profiles to be incorrect unless the user manually corrects the user profile for each of the services.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for user profile aggregation and inference generation. In an example, user profiles for a plurality of services may be stored by a unified profile service. Accordingly, a service may access user profile information for a given user from the unified profile service when the user interacts with the service. In some examples, a service may access the user profile from the unified profile service as needed or may cache at least a part of the user profile so as to improve computational performance.

When a new user profile is created for a user, traditionally the user may need to reenter information that has previously been provided to other services. Aspects of the present disclosure relate to generating an inferred user profile for a user, which may be used to provide inferred user information for inclusion in a new user profile. Accordingly, the user may not need to reenter information that may already be present as part of one or more other user profiles stored by the unified profile service. The inferred user profile may be generated based on one or more confidence levels in order to determine which user information is most likely to be accurate. In some examples, a user may update aspects of an inferred user profile, and may indicate that the update should be incorporated into other user profiles stored by the unified profile service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIGS. 4A-4D illustrate an overviews of example user interface elements according to aspects disclosed herein.

DETAILED DESCRIPTION

Figure 1:
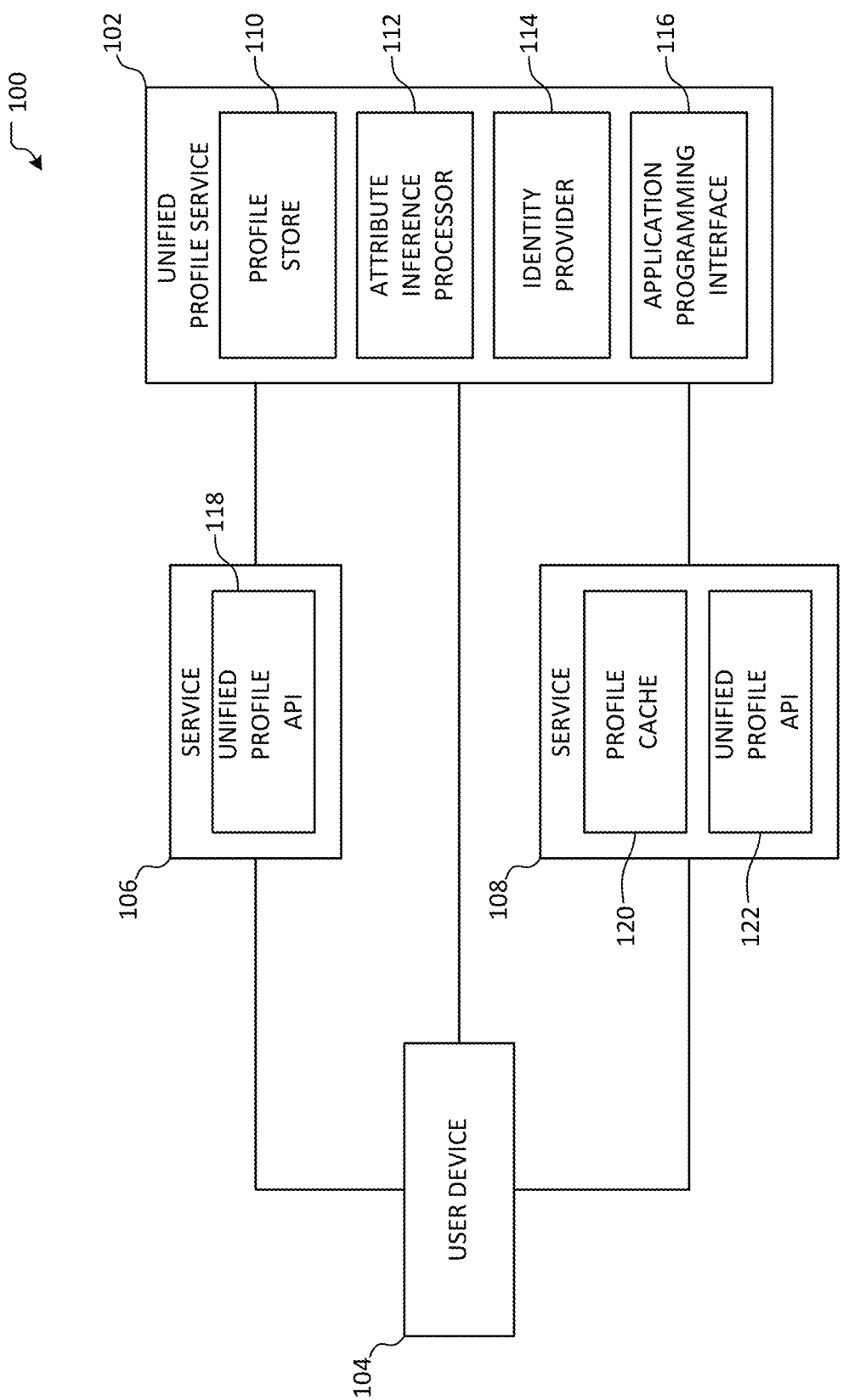
FIG. 1 illustrates an overview of an example system for user profile aggregation and inference generation.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

In an example, a user may access and/or interact with a service using a user device. The user may register or provide other information to the service, which may be stored as part of a user profile. For example, the user may create a user account with the service by completing a registration process, wherein the user account may be accessible using a username and password. As part of the registration process, the user may enter contact information (e.g., an email address, phone number, mailing address, etc.) and/or billing information (e.g., a credit card number, a bank account, a billing address, etc.), among other user information. When the user registers for other services, the other services may request information similar to what the user already entered. Thus, the user may need to provide the same information to multiple services. Further, if the user's information changes (e.g., the user moves to a different physical address, gets a new phone number, etc.), the user may need to update each user profile individually.

Accordingly, the present disclosure provides systems and methods for user profile aggregation and generation. As an example, a unified profile service may store user profiles for a user of a plurality of services, such that the user profiles may be associated with the user. Each of the user profiles may store a variety of attributes comprising user information. In some examples, an inferred user profile may be generated for a user. The inferred user profile may be based on the user profiles stored by the unified profile service for the user, such that the inferred user profile may comprise inferred attributes based on attributes of the individual user profiles. When the user registers with or accesses a new service (e.g., a service for which no user profile has been created or exists yet), the inferred user profile may be accessed by the new service in order to prepopulate or infer one or more attributes of the user profile for the user at the new service.

Aspects disclosed herein may provide various technical benefits, including, but not limited to, improved processing efficiency, improved data reliability, and reduced network traffic. For example, as a result of providing an inferred user profile comprising user information that is likely to be accurate and/or relevant, a user need not reenter information that is already known to the unified profile service. In another example, aspects disclosed herein may enable a user to quickly and efficiently update multiple user profiles with current user information at the same time. As a result, the user need not access multiple different services to update the user information, thereby conserving network resources and improving processing efficiency. Further, user information may be kept up to date, which serves to improve data reliability. Additionally, improved data reliability may further improve processing efficiency by reducing the amount of processing performed using incorrect or outdated data.

As used herein, a service may be an electronic communication service, a collaboration platform, a website, or an application, or any combination thereof, among other services hosted on one or more computing devices. In some examples, a service may employ a client and a server, wherein the server may be remote from the client and the client (e.g., a user device, an application, etc.) may interact with the server. For example, a user may use a web browser at a user device to access the service, or may use a native application executing on the user device. It will be appreciated that while example services are discussed herein, any of a variety of other services may be used without departing from the spirit of this disclosure.

A user profile may be used to store user information relating to and/or received from a user. For example, a user profile may comprise user information for a variety of attribute types, including, but not limited to, a username for the user, a screen name, an email address, a phone number, a mailing and/or billing address, a credit card number, a bank account number, a password or other authentication information, messages, documents, job title and/or job history information, etc. As used herein, an attribute may comprise user information and may be associated with an attribute type. As another example, a user profile may comprise data generated by a service that is associated with the user, such as user preference information or user browsing history, among other information. In an example, the user profile may comprise information that was requested from a user during a registration process and/or information received or generated while the user uses the service. In another example, the user profile may be associated with a user identifier (e.g., a token, a cryptographic key, a cryptographic signature, a cryptographic hash, or authentication information such as a username and password, etc.), which may be used by a unified profile service to identify one or more user profiles associated with the user. In some examples, the user identifier may be used by a service to identify the user (e.g., similar to a delegated authentication or authorization scheme such as OAuth or OpenID, etc.).

A unified profile service may store user profiles for one or more users. As an example, a service may use the unified profile service to store user profiles comprising user information for users of the service. In some examples, the service may use the unified profile service to store user profiles, while other information may be stored elsewhere. For example, the service may use a data store (e.g., a cloud-based data store, a local or remote data store, etc.) to store the other information. In an example, the service may cache at least a part of a user profile stored by the unified profile service, or the service may access information from the user profile service as-needed, or a combination thereof. In another example, the unified profile service may define a schema comprising one or more attribute types, such that user profiles stored by the unified profile service may comprise user information for one or more of the schema attribute types. In examples, a service may use a unique label for user information of a user profile, which may be mapped to an attribute type of the schema. Accordingly, an attribute may be associated with the unique label. For example, a service's "display name" label may map to a "username" attribute type in the schema. As a result, it may be possible to identify and/or compare user information across varying user profiles of individual services based on matching schema attribute types.

In some examples, an identity provider may be used by a service to authenticate users of the service. As an example, the identity provider may authenticate a user and may provide a user identifier to the service, wherein the user identifier may indicate the identity of the user to the service. For example, the identity provider may use aspects of the OpenID protocol or OAuth protocol in order to provide delegated authentication. The service may access a user profile associated with the service (e.g., from a unified profile service) based on the user identifier. As a result, the service may delegate aspects of authentication processing to the identity provider. In other examples, the service may perform aspects of authentication processing as an alternative to or in addition to using an identity provider.

A user may have a plurality of user profiles stored by a unified profile service. In an example, one or more user profiles of a user may be associated with a persona type. In examples, a user profile associated with a persona type may be termed a "persona" for the user, wherein the persona may be used by the user in a context associated with the persona type. A persona type may be associated with a context and/or privacy level. For example, a user may have a work user profile associated with a work persona type and a personal user profile associated with a personal persona type. The work user profile may comprise business contact information (e.g., a work phone number, a work email address, a work mailing address, etc.) and other business attributes (e.g., a job title, a manager, a subordinate employee, a professional profile picture, etc.). In another example, the personal user profile may comprise personal contact information (e.g., a home phone number and/or mobile phone number, a personal email address, a home mailing address, a casual profile picture, etc.) and other personal attributes (e.g., a list of friends, a list of family members, marital status, etc.). As such, the user may use user profiles associated with the work persona (e.g., the work user profile) when performing business tasks, while user profiles associated with the personal persona (e.g., the personal user profile) may be used for recreational or personal tasks. It will be appreciated that other personas, persona types, and/or associations may be used, such as associating one or more attributes with a persona type, or associating a user profile with a plurality of persona types.

In examples, persona types may be user-defined, or may be determined by a unified profile service, or a combination thereof. For example, a unified profile service may group services into a variety of persona groups based on information provided by the services, the type of information stored by the services, or external information relating to the services, among other information. As a result, a persona may be determined by the unified profile service for a new service based on one or more personas or persona groups already stored by the unified profile service. For example, the unified profile service may evaluate the new service and determine that the new service is similar to one or more pre-existing services associated with a persona type. As a result, the new service may be placed by the unified profile service to be in the same persona group as the similar service and may be associated with the same persona type as the similar service.

When a new user profile is created for a service (e.g., as a result of a user completing a registration process, accessing the service for the first time, etc.), an inferred user profile may be used to prepopulate or suggest information for attributes of the new user profile. In some examples, the unified profile service may generate an inferred user profile in response to a request for an inferred user profile. In other examples, the unified profile service may store an inferred user profile for a user (e.g., as may be generated periodically, as a result of user profile information changing, etc.), which may be provided in response to a request for an inferred user profile. Generating an inferred user profile may comprise evaluating attributes of one or more user profiles stored by the unified profile service. For example, user profiles comprising user information for the same attribute types (e.g., a username, an email address, a phone number, a mailing address, etc.), may be compared to identify which user profile likely comprises accurate, current, and/or relevant user information for inclusion in the inferred user profile. In some examples, the comparison may comprise an analysis of persona, context, and/or privacy level information according to aspects disclosed herein. In other examples, attributes may be inferred based on one or more external sources, such as public information or information from a social network, among other sources. It will be appreciated that any of a variety of other techniques may be used to generate an inferred user profile without departing from the spirit of this disclosure.

FIG. 1 illustrates an overview of an example system 100 for user profile aggregation and inference generation. As illustrated, system 100 comprises unified profile service 102, user device 104, and services 106-108. Unified profile service 102 may be used by services 106 and 108 to store user information according to aspects disclosed herein. For example, a user of user device 104 may interact with service 106, which may access a user profile for the user from unified profile service 102. In another example, a user may use user device 104 to manage (e.g., remove, add, modify, etc.) one or more user profiles stored by unified profile service 102.

Unified profile service 102 comprises profile store 110, attribute inference processor 112, identity provider 114, and application programming interface (API) 116. In an example, profile store 110 may store user profiles for users of services 106-108. For example, profile store 110 may store a user profile for service 106, which may be associated with a user of user device 104. As described herein, user profiles stored by profile store 110 may comprise one or more attributes, including a user identifier. In some examples, profiles for a given user may be associated with the same user identifier, or may be associated with different user identifiers. In other examples, profile store 110 may store one or more personas and/or persona types, with which user profiles may be associated. In an example, profile store 110 may store one or more inferred profiles for a user, which may have been generated by attribute inference processor 112. In another example, an inferred user profile may be generated in response to a user request by attribute inference processor 112.

Attribute inference processor 112 may evaluate one or more user profiles stored by profile store 110 in order to generate inferred attributes that may be used to create an inferred user profile for a user. As an example, attribute inference processor 112 may determine a confidence level for user profile attributes by evaluating similar labels and/or matching attribute types of user profiles to determine which attributes comprise accurate, current, and/or relevant user information. The evaluation may comprise a frequency analysis to determine whether and/or how often user information for a given attribute is present in multiple user profiles. For example, user information for a phone number attribute may be evaluated among multiple user profiles, and a frequency analysis may be used to determine which phone number more frequently appears within the user profiles. The phone number that is most frequent may be determined to be the phone number for the inferred phone number attribute. In another example, other information may be evaluated, such as whether a user has confirmed ownership of the phone number, whether the phone number is associated with the user based on public information, the source of the phone number (e.g., which service received the user information from the user), recentness of the phone number (e.g., whether a more recent phone number may be available from another user profile), or whether the phone number comprises an area code that matches a known address for the user. While the above examples are discussed with reference to a phone number, it will be appreciated that similar techniques may be used for other types of attributes and/or user information.

In some examples, attribute inference processor 112 may evaluate persona, context, and/or privacy level information according to aspects disclosed herein in order to determine which user information should be used to generate an inference among one or more user profiles. For example, user profiles for a similar context (e.g. persona groups) may be evaluated in order to generate an inferred profile comprising attributes and user information that are relevant to that context. As an example, a video game service may receive an inferred user profile generated based on one or more user profiles associated with other video game services. The user profiles for the other video game services may be more likely to comprise relevant user information as compared to a user profiles associated with a productivity service (e.g., a display name or username for a productivity service may be too formal or may pose privacy concerns as compared to similar attributes used by the user for other video game services). In other examples, attribute inference processor 112 may compare similar labels and/or matching attribute types, wherein the attributes may not be the same type of attribute. For example, one user profile may comprise a "username" attribute, while another user profile may store a "display name" attribute. Fuzzy matching, pattern recognition, or other techniques may be used to determine whether a label associated with user information is similar between two user profiles.

As illustrated, unified profile service 102 further comprises identity provider 114. In some examples, identity provider 114 may be separate from unified profile service 102 and/or may be provided by a third party or other entity. Identity provider 114 may authenticate a user of services 106-108. For example, a user may use user device 104 to provide authentication credentials to identity provider 114, which may be used to authenticate the user. Authentication may comprise determining a user identifier, which may be used by services 106-108 to identify the user. In some examples, a user profile of the user (e.g., which may be stored by profile store 110) may be associated with the user identifier in order to facilitate retrieval of the user profile. While examples comprising an identity provider are provided herein, it will be appreciated that user authentication may be performed using any of a variety of other techniques.

API 116 may be used to facilitate communication with unified profile service 102. For example, services 106 and 108 may communicate with API 116 of unified profile service 102 via unified profile APIs 118 and 122, respectively, as illustrated in FIG. 1. As such, API 116 may comprise a set of commands that may be used by unified profile APIs 118 and 122 to access and/or store information (e.g., at profile store 110), request an inferred user profile (e.g., as may be stored by profile store 110 or generated on-demand by attribute inference processor 112), or request user authentication processing by identity provider 114. In examples, user device 104 may communicate with unified profile service 102 to manage a user profile stored by profile store 110. A user of user device 104 may edit user information, correct attributes of one or more user profiles, delete a user profile, or manage personas, among other operations.

As illustrated, service 106 further comprises unified profile API 118, while service 108 comprises profile cache 120 in conjunction with unified profile API 122. Accordingly, service 106 may request aspects of a user profile from unified profile service 102 via unified profile API 118 when needed, while service 108 may cache information received from unified profile service 102 using profile cache 120 and may therefore need not always request information from unified profile service 102. It will be appreciated that other techniques may be used to access and/or manipulate data stored by unified profile service 102 without departing from the spirit of this disclosure.

Figure 2:
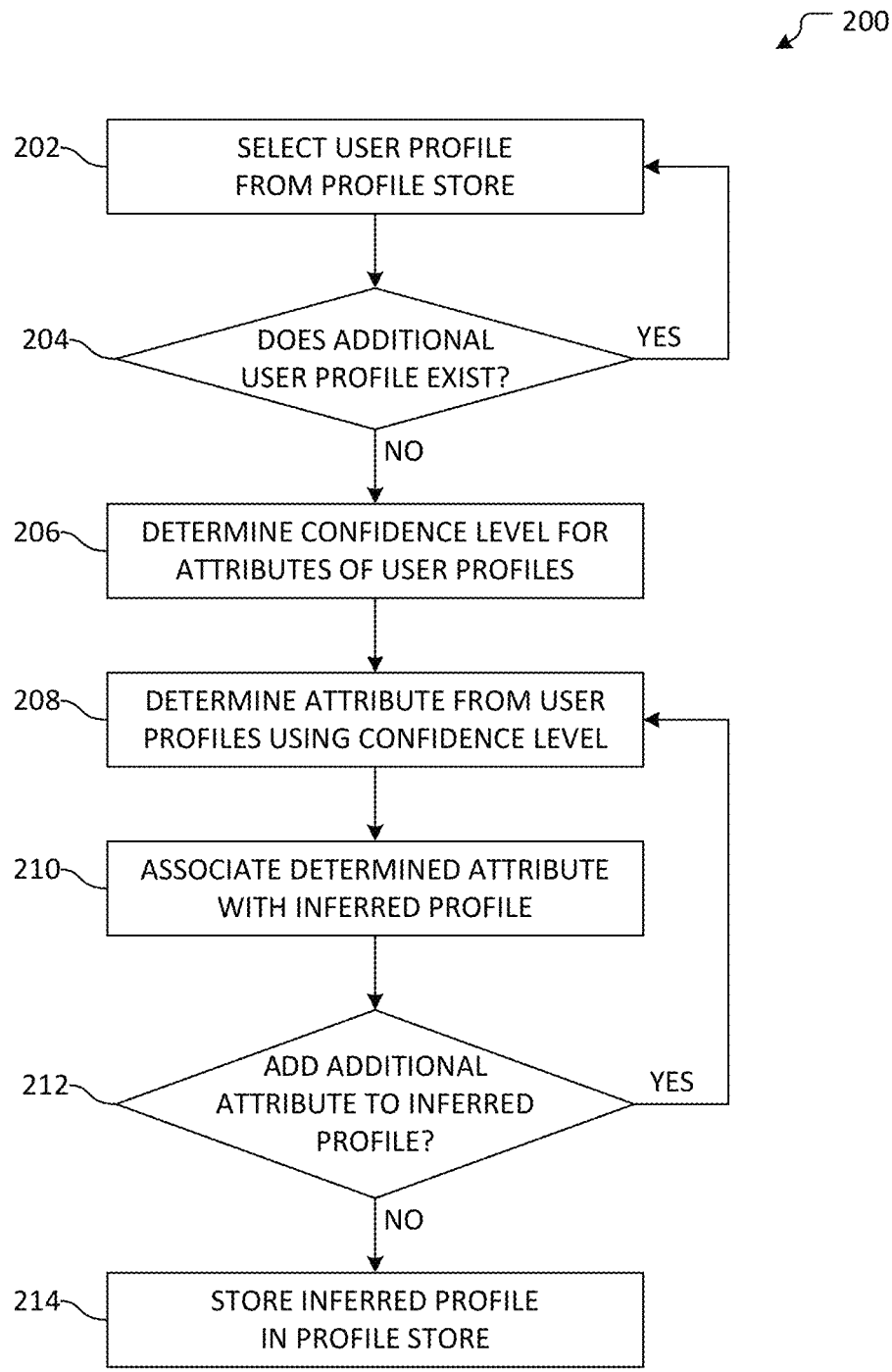
FIG. 2 illustrates an overview of an example method for generating an inferred user profile.

FIG. 2 illustrates an overview of an example method 200 for generating an inferred user profile. In some examples, method 200 may be performed by one or more computing devices, including, but not limited to, mobile computing devices, tablet computing devices, laptop computing devices, or server computing devices, or any combination thereof. In examples, method 200 may be performed by unified profile service 102 in FIG. 1.

Method 200 may be performed in response to a request or periodically, among other examples. Method 200 begins at operation 202, where a user profile may be selected from a profile store (e.g., profile store 110 in FIG. 1). In an example, a user profile may be selected based on one or more criteria, such as how recently the profile was updated or based on alphabetical order, among other criteria. In another example, a user profile may be selected randomly or using other techniques.

Flow progresses to determination 204, where it may be determined whether an additional user profile exists. The determination may comprise accessing the profile store to determine whether an additional user profile for the user is available. In some examples, the profile store may be accessed using a user identifier or other information in order to locate one or more user profiles associated with the user. In other examples, the determination may comprise determining whether an identified user profile should be processed. For example, user profiles that are dissimilar or otherwise not relevant (e.g., profiles associated with a different persona types than those of the current evaluation, profiles that are inactive, etc.) may, in some examples, be omitted from processing by method 200. If an additional user profile is identified, flow branches "YES" to operation 202, where the user profile may be selected for processing at operation 206. Flow may loop between operations 202 and 204.

At operation 206, confidence levels may be determined for one or more attributes of one or more selected user profiles. The evaluation may comprise a frequency analysis to determine whether and/or how often user information for an attribute of a user profile is present in other user profiles. In another example, other information may be evaluated, such as whether a user has confirmed or validated the attribute (e.g., confirmed ownership of a phone number or email address, validated the correctness of a mailing address, etc.) or whether more recent user information is available for the attribute from another user profile. In some examples, a confidence level may be based on an evaluation of an attribute using public information. In other examples, only a subset of attributes of the selected user profiles may be evaluated (e.g., based on context and/or privacy level, etc.). It will be appreciated that a variety of other techniques may be used to generate a confidence level for the attributes of the selected user profile.

If, however, an additional user profile is not identified, flow branches "NO" to operation 208, where an attribute may be determined based on confidence level. The determination may comprise comparing similar labels and/or matching attribute types (e.g., defined by the unified profile service schema) among a plurality of profiles based on confidence level, which may have been determined at operation 206 as described above. Matching attributes may be determined based on explicit matching of the attributes to particular attribute types defined by the unified profile service schema, the type of attribute (e.g., a username attribute, a display name attribute, etc.), a label associated with the attribute, or the user information associated with the attribute (e.g., attributes that each comprise a phone number, email address, etc.), among other techniques. The comparison may comprise ranking confidence levels, determining a highest or lowest confidence level, and/or comparing confidence levels to a threshold. In some examples, the comparison may be based on user-defined logic. While example techniques are disclosed herein, it will be appreciated that an attribute may be determined using any of a variety of other techniques.

At operation 210, the determined attribute may be associated with the inferred user profile. In an example, associating the attribute with the inferred user profile may comprise storing the attribute of the user profile associated as part of the inferred user profile. In another example, the association may be a reference to the user profile associated with the attribute, such that the attribute may be referenced by the inferred user profile rather than stored by the inferred user profile directly. In some examples, a persona type may be determined for the attribute. The persona type may be determined based on information associated with the user profile, the attribute, and/or the inferred user profile. Other association techniques may be used without departing from the spirit of this disclosure.

Moving to determination 212, it may be determined whether to add an additional attribute to the inferred user profile. In an example, the determination may comprise evaluating whether additional attributes should be stored by the inferred user profile or whether additional attributes are available from user profiles in the profile store. In another example, the determination may comprise evaluating one or more personas to determine whether an attribute that is typically present in user profiles associated with the personas should be incorporated into the inferred user profile. If it is determined that an additional attribute should be added to the inferred user profile, flow branches "YES" to operation 208, where a subsequent attribute may be determined. Flow may loop between operations 208-212 while additional attributes should be incorporated into the inferred user profile.

If, however, it is determined that an additional attribute should not be added to the inferred user profile, flow instead branches "NO" to operation 214, where the inferred user profile may be stored in the profile store. In an example, the inferred user profile may be associated with one or more user profiles from which it was inferred. In another example, the inferred user profile may be associated with a user identifier, which may be used to later retrieve the inferred user profile. In some examples, the inferred user profile may comprise one or more references to other user profiles of the profile store, wherein a reference may refer to attributes of the other user profiles from which an attribute of the inferred user profile was inferred. The stored inferred user profile may be retrieved in response to a request for an inferred user profile for the user, or may be provided in response to a request to generate an inferred user profile on-demand according to aspects disclosed herein. Flow terminates at operation 214.

Figure 3A:
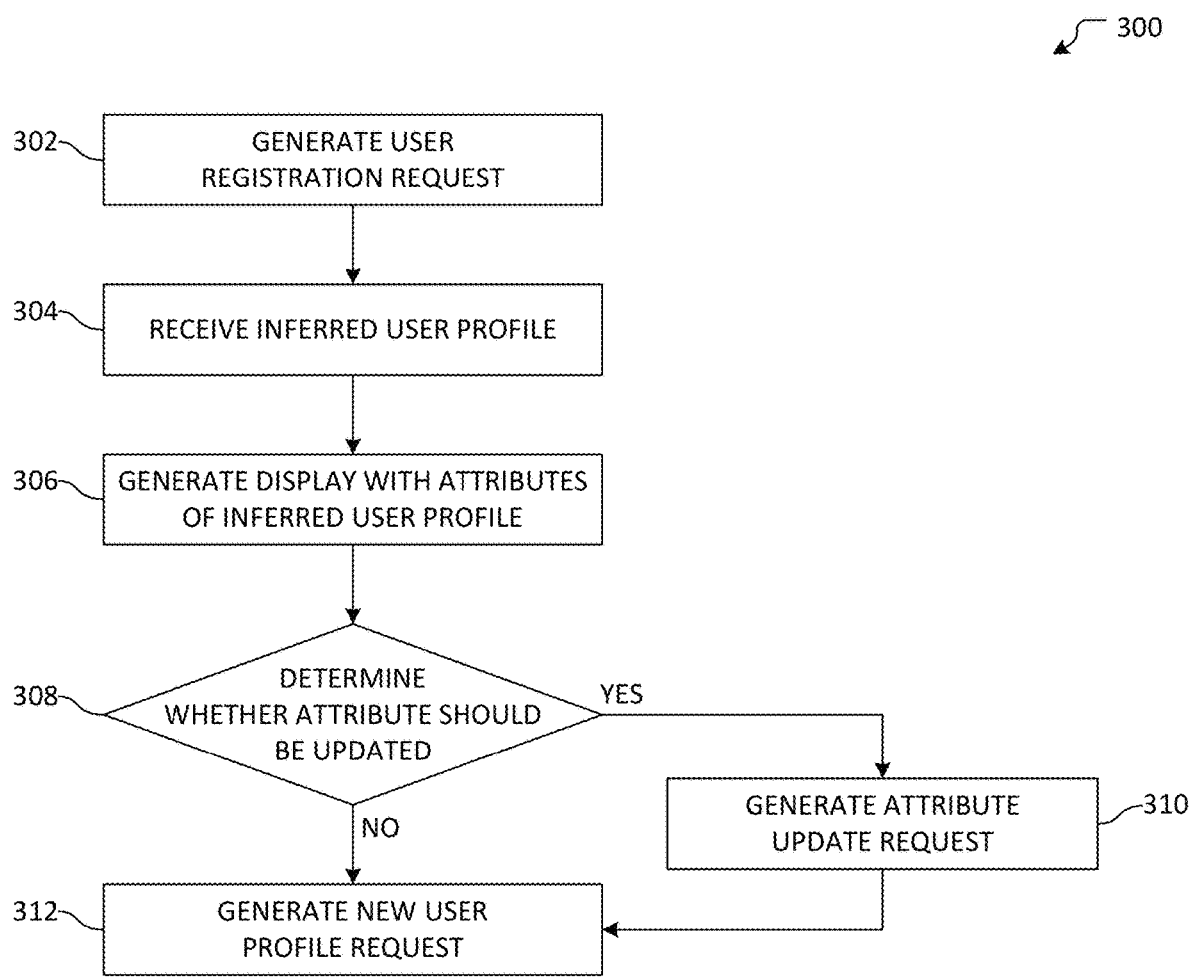
FIG. 3A illustrates an overview of an example method for registering a user at a user device based on an inferred user profile.

FIG. 3A illustrates an overview of an example method 300 for registering a user at a user device based on an inferred user profile. In an example, method 300 may be performed by one or more computing devices. In some examples, method 300 may be performed by user device 104 in FIG. 1. In other examples, method 300 may be performed by a service, such as services 106 or 108 in FIG. 1. In an example, method 300 may be performed to generate a new user profile for a service as part of a registration process.

Method 300 begins at operation 302, where a user registration request may be generated. In an example, generating a user registration request may comprise providing a request to a unified profile service (e.g., unified profile service 102 in FIG. 1). In some examples, the registration request may comprise a user identifier or other user information, which may be used to identify one or more user profiles or other information associated with the user. In other examples, the registration request may comprise additional information, including, but not limited to, a persona type and/or one or more expected attribute types (e.g., indicating that an inferred user profile should comprise a username, and email address, and a phone number, etc.). In another example, a persona type may be determined by the unified profile service based on one or more personas and profiles already stored by the unified profile service. For example, the unified profile service may evaluate the service for which the request was received and determine that the service is similar to another service already associated with a particular persona type. As a result, the persona type for the similar service may be used as a persona type for the request.

At operation 304, an inferred user profile may be received. In an example, the inferred user profile may be received in response to the generated registration request. The inferred user profile may be received from a unified profile service. In some examples, the inferred user profile may have been generated in response to the registration request. In other examples, the inferred user profile may have been previously generated and may have been retrieved and provided in response to the registration request. In an example, the inferred user profile may have been generated by performing aspects of method 200, as was discussed above with respect to FIG. 2. In another example, additional information from the registration request may have been evaluated and used to generate and/or modify the inferred user profile.

Moving to operation 306, a display may be generated using the attributes of the received inferred user profile. In an example, the display may comprise one or more labels and input fields. A label may display information relating to an attribute type. For example, a "mobile phone number" label may be used for a phone number attribute type. An input field may be associated with a label, such that user input may be received by the input field. In some examples, one or more input fields may be empty or may comprise text to provide a hint or other information to a user. In other examples, one or more input fields may be prepopulated with information from the received inferred user profile, such that the user may not need to manually enter information into the input fields. In another example, a dropdown menu or other display may be provided to present one or more entries of inferred user information for an input field, which entries may be ordered based on the received inferred user profile.

At determination 308, it may be determined whether an attribute should be updated. In an example, the determination may comprise evaluating implicit and/or explicit factors, such as identifying a user modification of an input field comprising information from the inferred user profile or receiving input at a user interface element (e.g., an "X" or "edit" button, etc.). In some examples, a user may indicate that the updated information should be used to update information stored by one or more other user profiles in a profile store.

If it is determined that an attribute should be updated, flow branches "YES" to operation 310, where an attribute update request may be generated. In an example, the attribute update request may comprise the updated information. In another example, the attribute update request may comprise an indication relating to one or more other user profiles and/or attributes that should be updated based on the updated information. As an example, a user may indicate that a phone number of the inferred user profile is incorrect and may provide an updated phone number. The updated phone number may be used to update the phone number stored by one or more other user profiles, thereby enabling information to be updated and consistent across multiple user profiles without further action by the user. In other examples, the user may indicate that a particular attribute should be updated for certain services (and associated user profiles) and not for others. Flow then progresses to operation 312, which is discussed below.

If, however, it is determined that an attribute should not be updated, flow branches "NO" to operation 312, where a new user profile request may be generated. In an example, the new user profile request may comprise information received at one or more input fields of the display generated at operation 306. In another example, the new user profile request may comprise inferred user information from the inferred user profile received at operation 304. In some examples, the new user profile request may be provided to a service as part of a registration process, which the service may use to create a new user profile with a unified profile service. In other examples, the new user profile request may be provided to a unified profile service. In examples, the new user profile request may be communicated using an API (e.g., API 116 in FIG. 1). Flow terminates at operation 312.

Figure 3B:
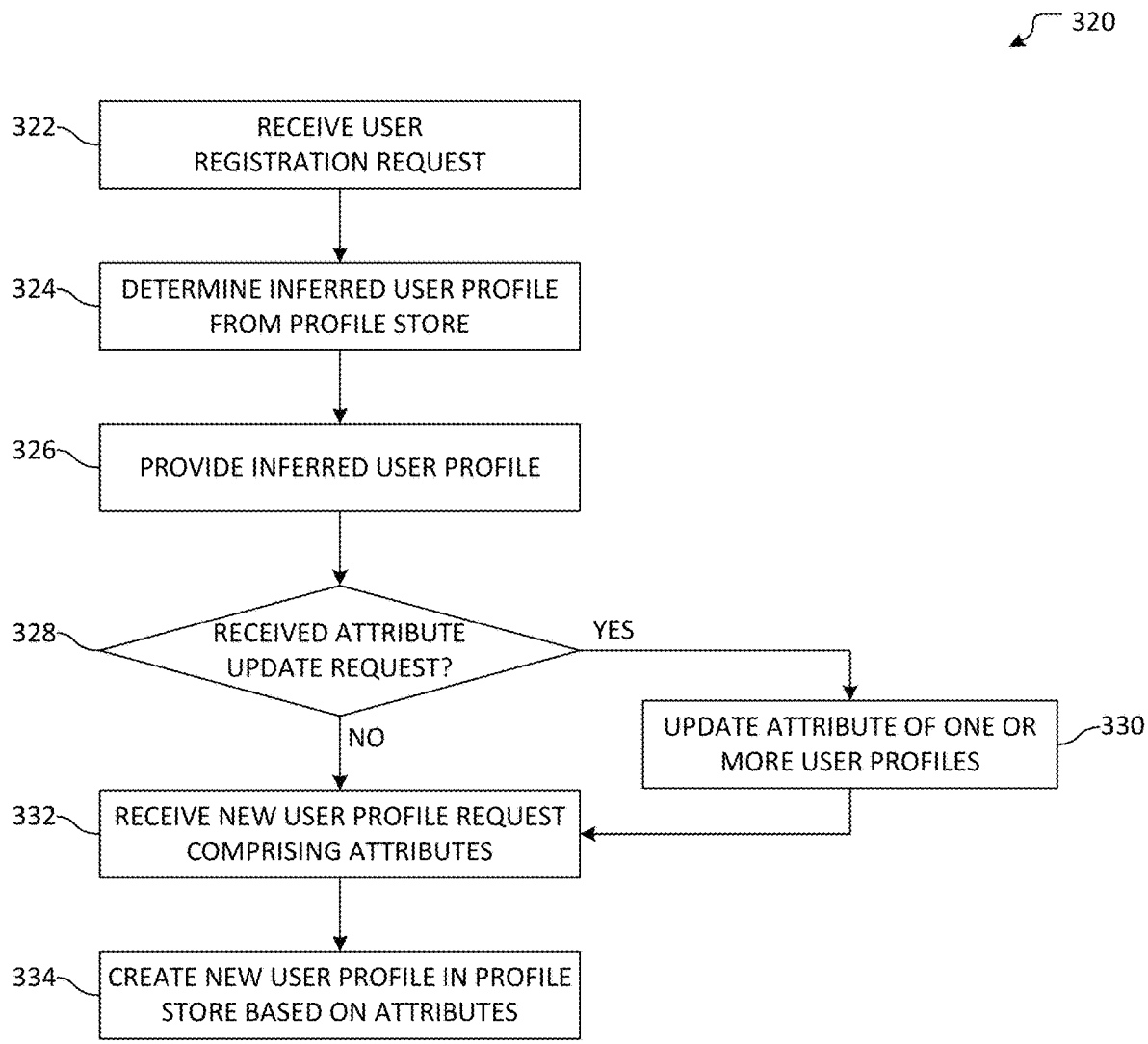
FIG. 3B illustrates an overview of an example method for processing a user registration based on an inferred user profile.

FIG. 3B illustrates an overview of an example method 320 for processing a user registration based on an inferred user profile. In an example, method 320 may be performed by one or more computing devices. In another example, method 320 may be performed by a unified profile service, such as unified profile service 102 in FIG. 1. Method 320 begins at operation 322, where a user registration request may be received. In an example, the user registration request may be received from a service (e.g., services 106 or 108 in FIG. 1) or from a user device (e.g., user device 104 in FIG. 1). The user registration request may comprise a user identifier or other information associated with a user, which may be used to identify and/or generate an inferred user profile for the user.

At operation 324, an inferred user profile may be determined from the profile store. In an example, determining the inferred user profile may comprise accessing a pre-generated inferred user profile associated using a received user identifier or other information. In some examples, the pre-generated inferred user profile may be modified based on one or more indications received as part of the user registration request, such as an indication of a persona type or one or more expected attributes. For example, user attributes associated with a work persona (e.g., a user profile associated with a work persona type) may be omitted when generating an inferred user profile for a personal persona. In another example, determining the inferred user profile may comprise generating the inferred user profile based on one or more user profiles stored by the profile store. In examples, generating the inferred user profile may comprise performing aspects of method 200, as was discussed above with respect to FIG. 2.

Moving to operation 326, the inferred user profile may be provided. In an example, the inferred user profile may be provided as an XML or JSON object, or may be provided via an API (e.g., API 116 in FIG. 1). In some examples, the inferred user profile may comprise one or more attributes, wherein user information may be associated with each attribute. In other examples, multiple entries of user information may be provided for an attribute (e.g., multiple mailing addresses may be provided for a mailing address attribute, etc.). In an example, the multiple entries may be ordered based on confidence level (e.g., based on which is most likely to be accurate or relevant, etc.).

At determination 328, it may be determined whether an attribute update request is received. In some examples, the attribute update request may be received as a result of an explicit and/or implicit user indication that user information of the inferred user profile should be updated (e.g., as was discussed above with respect to operations 308-310 in FIG. 3A). If it is determined that an attribute update request is received, flow branches "YES" to operation 330, where an attribute of one or more user profiles (including the inferred user profile) may be updated. In some examples, the received attribute update request may comprise an indication relating to one or more user profiles that should be updated. In other examples, the received attribute request may comprise an indication that all user profiles associated with the user should be updated, or may indicate that user profiles associated with one or more personas, persona types, and/or particular services should be updated. The attributes of one or more user profiles in the profile store may be updated accordingly. Flow progresses to operation 332, which is discussed below.

If, however, it is determined that an attribute update request is not received, flow branches "NO" to operation 332. At operation 332, a new user profile request may be received, wherein the new user profile request may comprise user information for one or more attributes. In an example, the new user profile request may comprise information received from a user, information relating to the inferred user profile (e.g., as was provided at operation 326), or a combination thereof. In some examples, the new user profile request may be received via an API, such as API 116 in FIG. 1.

Moving to operation 334, a new user profile may be created in the profile store based on the attributes received in the new user profile request. Creating the new user profile may comprise generating a new user profile comprising the received attributes. In an example, the new user profile may be associated with a user identifier or other information associated with a user. In another example, the new user profile may be associated with one or more other user profiles for the user. In some examples, an inferred profile for the user may be updated based on the new user profile. Flow terminates at operation 334.

FIGS. 4A-4D illustrate overviews of example user interface elements according to aspects disclosed herein. As an example, a user device (e.g., user device 104 in FIG. 1) may be used to present aspects of the example user interface elements to a user. The user may interact with the presented aspects in order to register with a service, thereby resulting in the creation of a new user profile. In some examples, the user may indicate that inferred information is incorrect and/or that information contained in one or more other user profiles should be updated.

Figure 4A:
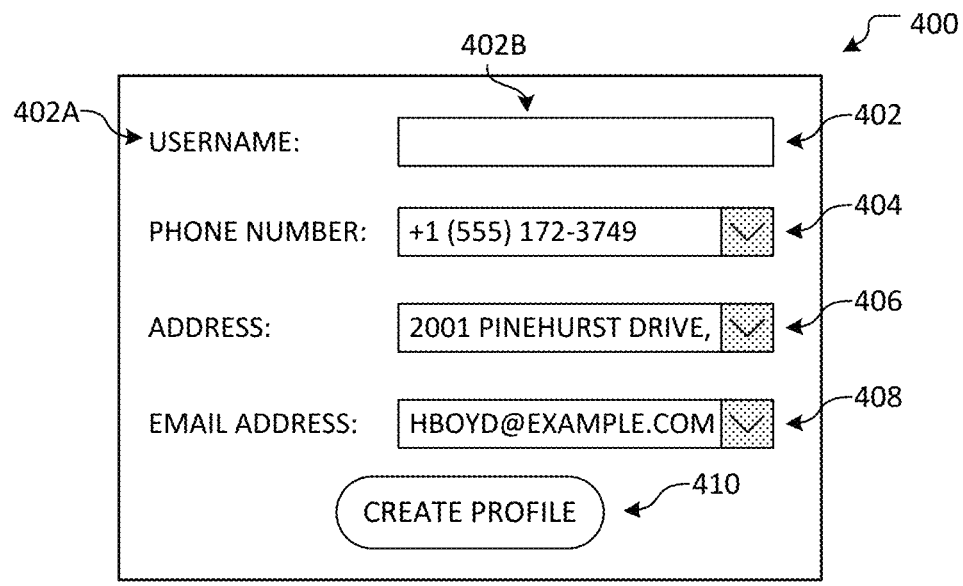

With reference to FIG. 4A, example user interface (UI) 400 comprises username input 402, phone number input 404, address input 406, and email address input 408. Inputs 402-408 may be used to receive user input relating to attributes of a user profile. As illustrated, username input 402 is comprised of label 402A and input field 402B. Label 402A may display information relating to a user profile attribute, such as a hint or a title. Input field 402B may receive user input comprising information relating to a user profile attribute. In some examples, input field 402B may be prepopulated with information based on an inferred user profile, as discussed above.

While inputs 404-408 are comprised of similar elements as username input 402, inputs 404-408 comprise inferred information. In some examples, a downward arrow may indicate that other suggestions are available for selection by a user. In other examples, inferred user information may be displayed within an input field using greyed-out text, thereby indicating that the inferred user information may be submitted unless alternative user input is received. It will be appreciated that other techniques may be used to generate a display based on an inferred user profile without departing from the spirit of this disclosure. Example UI 400 further comprises create profile button 410, which, when pressed by a user, may cause the information of inputs 402-408 to be used to generate a new user profile. As an example, operation 312 in FIG. 3A may be performed when create profile button 410 is pressed.

Figure 4B:
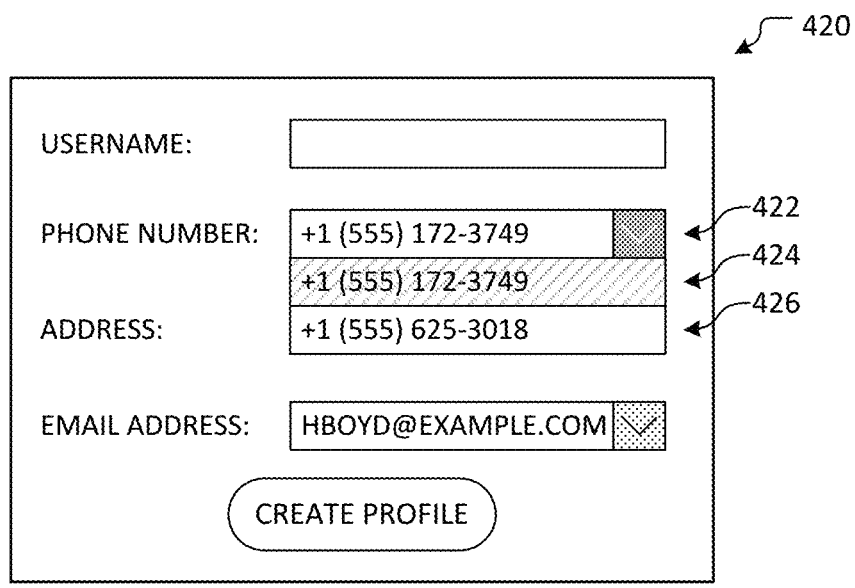

Turning now to FIG. 4B, example UI 420 illustrates example dropdown options 424-426, which may be presented as a result of a user interacting with downward arrow 422. As discussed above, multiple user information entries may be inferred for a given attribute. As such, the phone number of dropdown option 424 may have been inferred and used to automatically prepopulate a phone number for the user, as illustrated by the shaded background. However, an additional phone number may have been identified and provided to the user as dropdown option 426. In some examples, entries may be ranked based on confidence level, such that dropdown option 424 may have been determined to be more likely to be correct than dropdown option 426.

FIG. 4C illustrates user interface elements 442-446 that may be used by a user to indicate that inferred user information is incorrect. For example, UI element 444 may be pressed by a user in order to indicate that the inferred address is incorrect and should be removed, so as to enable the user to enter alternative information. It will be appreciated that other user experience techniques may be used without departing from the spirit of this disclosure.

FIG. 4D illustrates an example prompt 462 which may be used to update attributes of other user profiles. In an example, prompt 462 may be displayed as a result of a user pressing create profile button 410. It may be determined that a user has entered information that is different from the inferred user profile and/or one or more other user profiles associated with the user. As a result, the user may be presented with checkboxes 464-468, which may be used by the user to indicate whether other user profiles should be updated with the different information. As illustrated, the user may have indicated via checkbox 464 that a user profile associated with a social network should be updated, while checkboxes 466 and 468 remain unchecked so as to indicate that no change should be made to the user profiles associated with those services.

While example user interface elements and user experience techniques have been described above, it will be appreciated that other elements and/or techniques may be used in conjunction with an inferred user profile without departing from the spirit of this disclosure.

Figure 5:
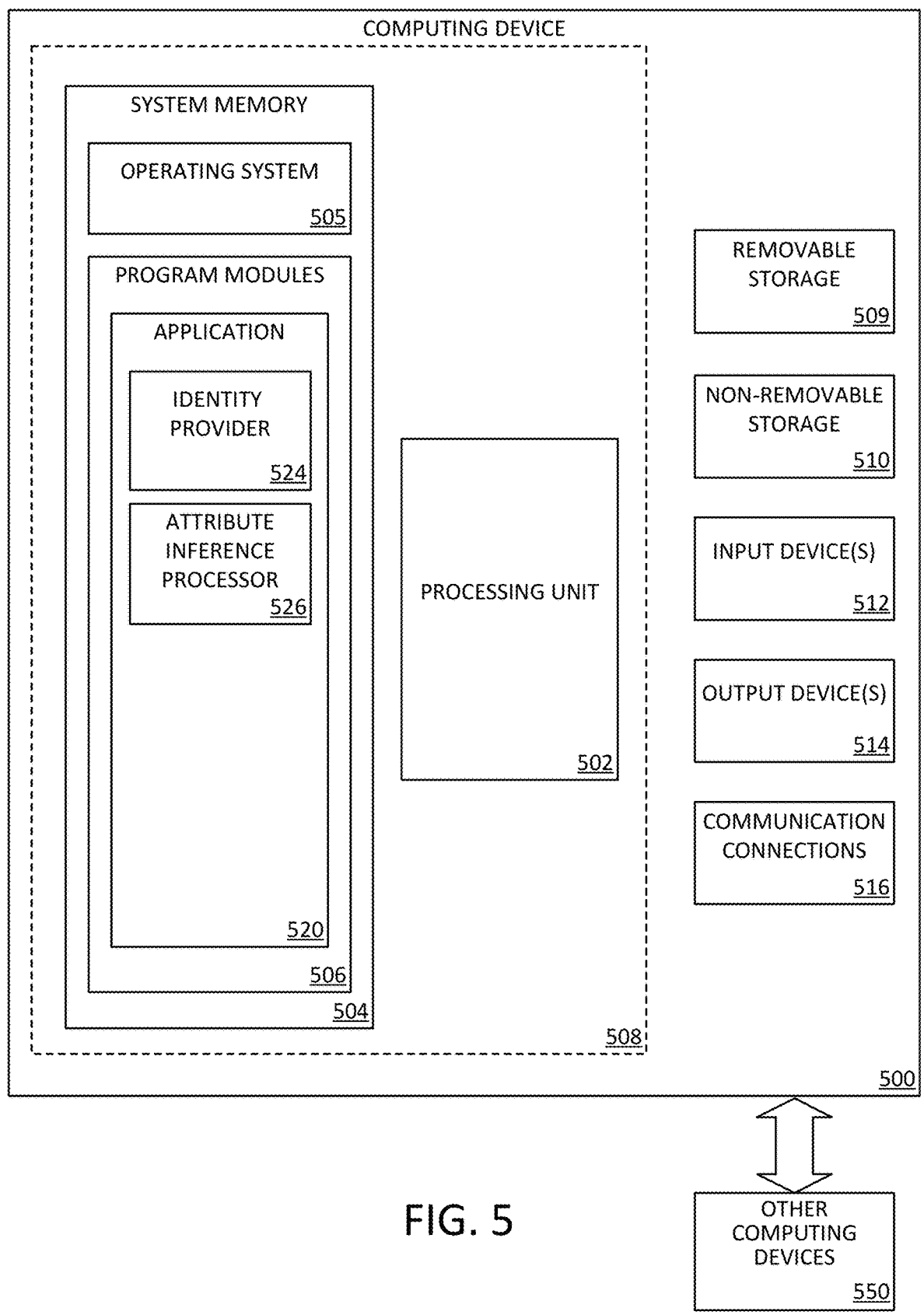
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. The computing device components described below may be suitable for the computing devices described above. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for performing the various aspects disclosed herein such as identity provider 524 and attribute inference processor 526. The operating system 505, for example, may be suitable for controlling the operation of the computing device 500. Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., application 520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
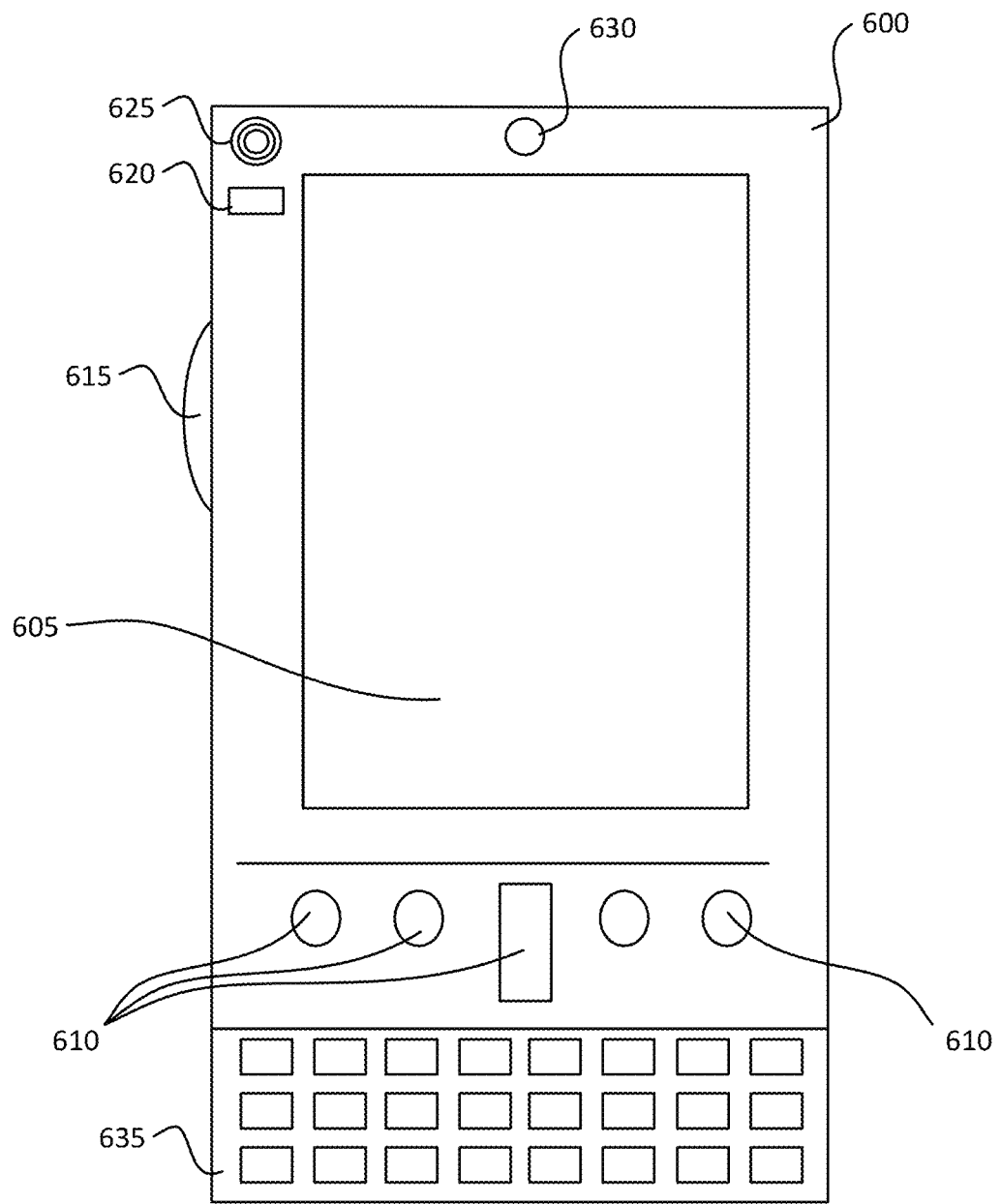
FIGS. 6A and 6B are simplified block diagrams of a mobile computing device with which aspects of the present disclosure may be practiced.
Figure 6B:
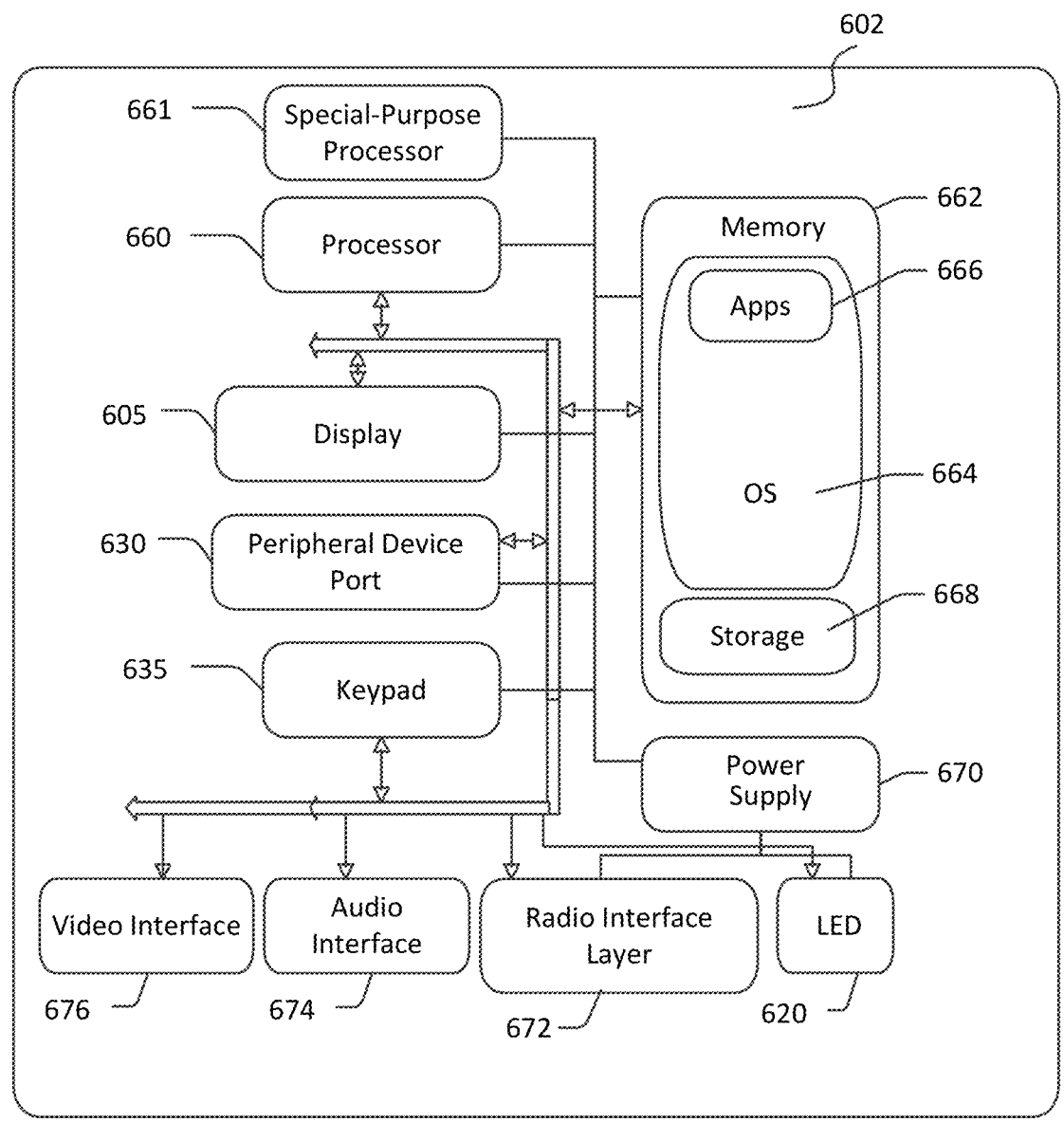

FIGS. 6A and 6B illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein (e.g., search engine, extractor module, relevancy ranking module, answer scoring module, etc.).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Figure 7:
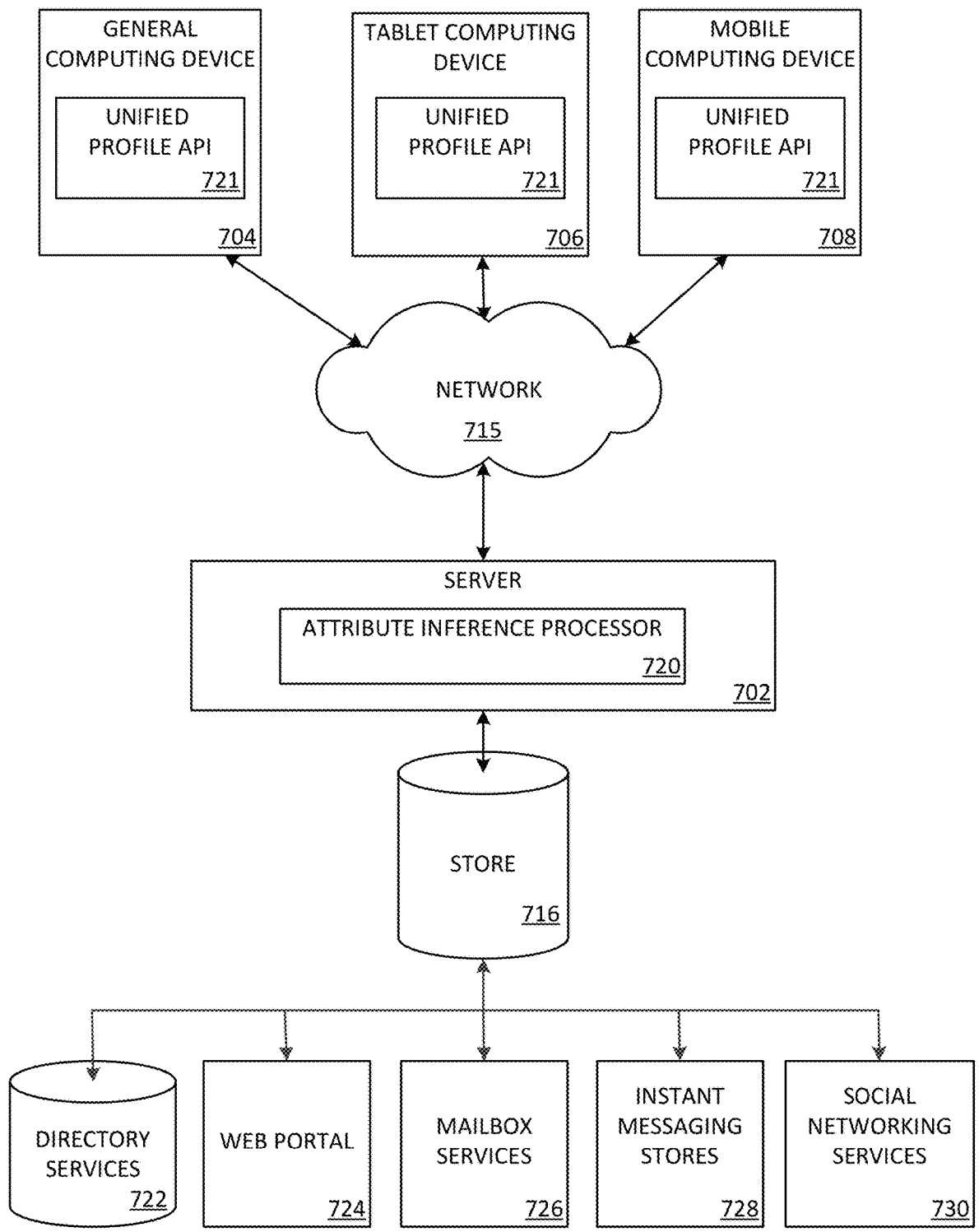
FIG. 7 is a simplified block diagram of a distributed computing system in which aspects of the present disclosure may be practiced.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking site 730. Unified profile API 721 may be employed by a client that communicates with server device 702, and/or attribute inference processor 720 may be employed by server device 702. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these embodiments of the computing devices may obtain content from the store 716, in addition to receiving graphical data useable to be either pre-processed at a graphic-originating system, or post-processed at a receiving computing system.

Figure 8:
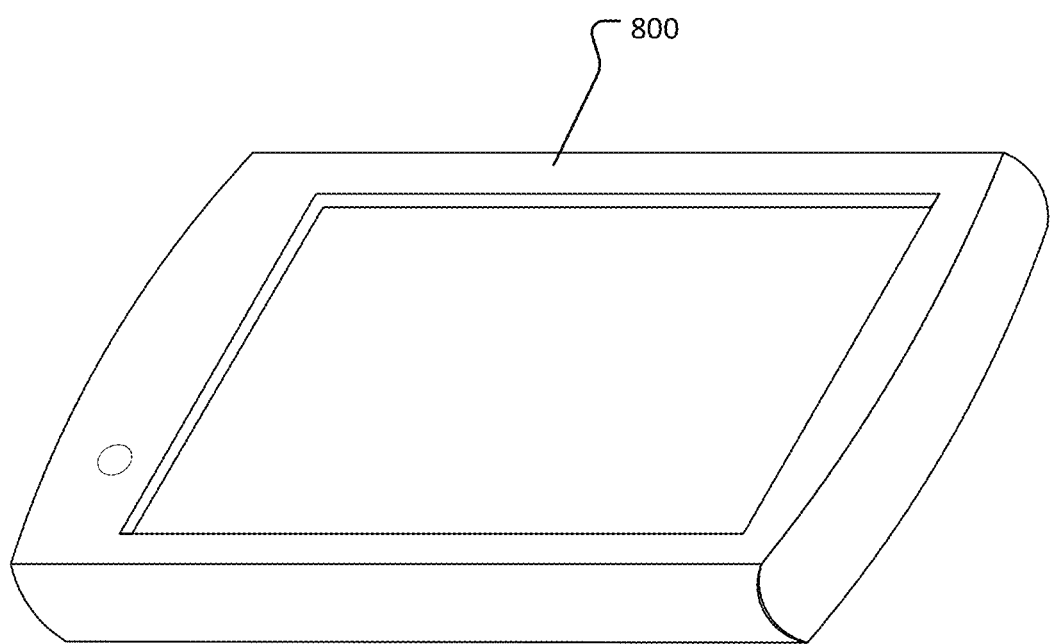
FIG. 8 illustrates a tablet computing device for executing one or more aspects of the present disclosure.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, cause the system to perform a set of operations. The set of operations comprises: accessing a first user profile and a second user profile from a profile store, wherein the first user profile and the second user profile are associated with a user; generating a first confidence score for a first attribute comprising user information from the first user profile for an attribute type and a second confidence score for a second attribute comprising user information from the second user profile for the attribute type; determining, based on the first confidence score and the second confidence score, an inferred attribute from the first attribute and the second attribute; generating an inferred user profile comprising the inferred attribute; receiving, from a computing device, a request for an inferred user profile associated with the user; and providing the inferred user profile in response to the received request. In an example, accessing the first user profile and the second user profile comprises identifying the first user profile and the second user profile from a plurality of user profiles based on determining that the first user profile and the second user profile are associated with a persona type. In another example, the request for an inferred user profile is associated with a service, and wherein the first user profile and the second user profile are accessed based on determining that the first user profile and the second user profile are associated with one or more additional services that are similar to the service. In a further example, the first user profile, the second user profile, and the inferred user profile are associated with a user identifier associated with the user, and wherein the request comprises the user identifier. In yet another example, the user identifier is determined by an identity provider based on receiving authentication credentials associated with the user. In a further still example, the set of operations further comprises: receiving an indication of an update to the inferred attribute, wherein the indication comprises updated user information; and updating user information for the attribute type of at least one user profile associated with the user based on the updated user information. In another example, generating the first confidence score comprises evaluating the first attribute based on user information for the attribute type from one or more other user profiles associated with the user, and wherein generating the second confidence score comprises evaluating the second attribute based on user information for the attribute type from one or more other user profiles associated with the user.

In another aspect, the technology relates to a method for generating an inferred user profile based on a persona type. The method comprises: determining, based on the persona type, a first user profile and a second user profile from a profile store; generating a first confidence score for a first attribute comprising user information from the first user profile for an attribute type and a second confidence score for a second attribute comprising user information from the second user profile for the attribute type; determining, based on the first confidence score and the second confidence score, an inferred attribute from the first attribute and the second attribute, wherein the inferred attribute comprises user information from at least one of the first attribute or the second attribute; generating the inferred user profile comprising the inferred attribute; receiving, from a computing device, a request for an inferred user profile associated with a user, wherein the request indicates the persona type; and providing the inferred user profile in response to the received request. In an example, the request for an inferred user profile is associated with a service, and wherein the first user profile and the second user profile are determined based at least in part on the first user profile and the second user profile being associated with one or more services that are similar to the service. In another example, the first user profile, the second user profile, and the inferred user profile are associated with a user identifier associated with the user, and wherein the request comprises the user identifier. In a further example, the user identifier is determined by an identity provider based on receiving authentication credentials associated with the user; and wherein providing the inferred user profile comprises identifying the inferred user profile based on an association of the inferred user profile with the user identifier. In yet another example, the method further comprises: receiving an indication of an update to the inferred attribute, wherein the indication comprises updated user information; and updating user information for the attribute type of at least one user profile associated with the user based on the updated user information, wherein the at least one user profile is associated with the persona type. In a further still example, generating the first confidence score comprises evaluating the first attribute based on user information for the attribute type from one or more other user profiles associated with the user, and wherein generating the second confidence score comprises evaluating the second attribute based on user information for the attribute type from one or more other user profiles associated with the user.

In a further aspect, the technology relates to a method for generating an inferred user profile. The method comprises: accessing a first user profile and a second user profile from a profile store, wherein the first user profile and the second user profile are associated with a user; generating a first confidence score for a first attribute comprising user information from the first user profile for an attribute type and a second confidence score for a second attribute comprising user information from the second user profile for the attribute type; determining, based on the first confidence score and the second confidence score, an inferred attribute from the first attribute and the second attribute; generating an inferred user profile comprising the inferred attribute; receiving, from a computing device, a request for an inferred user profile associated with the user; and providing the inferred user profile in response to the received request. In an example, accessing the first user profile and the second user profile comprises identifying the first user profile and the second user profile from a plurality of user profiles based on determining that the first user profile and the second user profile are associated with a persona type. In another example, the request for an inferred user profile is associated with a service, and wherein the first user profile and the second user profile are accessed based on determining that the first user profile and the second user profile are associated with one or more services that are similar to the service. In a further example, the first user profile, the second user profile, and the inferred user profile are associated with a user identifier associated with the user, and wherein the request comprises the user identifier. In yet another example, the user identifier is determined by an identity provider based on receiving authentication credentials associated with the user. In a further still example, the method further comprises: receiving an indication of an update to the inferred attribute, wherein the indication comprises updated user information; and updating user information for the attribute type of at least one user profile associated with the user based on the updated user information. In another example, generating the first confidence score comprises evaluating the first attribute based on user information for the attribute type from one or more other user profiles associated with the user, and wherein generating the second confidence score comprises evaluating the second attribute based on user information for the attribute type from one or more other user profiles associated with the user.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
at least one processor; and
memory storing instructions that, when executed by the at least one processor, cause the system to perform a set of operations, the set of operations comprising:
   accessing a first user profile and a second user profile from a profile store, wherein the first user profile and the second user profile are associated with a user;
   receiving, from a computing device based on a new user registration, a request for an inferred user profile associated with the user;
   determining a first accuracy confidence level for a first attribute of the first user profile and a second accuracy confidence level for a second attribute of the second user profile, wherein the first attribute and the second attribute are of a first attribute type, and wherein determining the first accuracy confidence level for the first attribute and the second accuracy confidence level for the second attribute further comprises evaluating publicly available contact information of the user;
   selecting the first attribute over the second attribute for the inferred user profile in response to determining that the first accuracy confidence level for the first attribute is higher than the second accuracy confidence level for the second attribute;
   providing, in response to the received request, the inferred user profile for creating a new user profile for the user;
   receiving, from the computing device, the new user profile comprising at least an inferred attribute, of the inferred user profile; and
   storing, in the profile store, the new user profile for the user.

2. The system of claim 1, wherein accessing the first user profile and the second user profile comprises identifying the first user profile and the second user profile from a plurality of user profiles based on determining that the first user profile and the second user profile are associated with a persona type.

3. The system of claim 1, wherein the request for an inferred user profile is associated with a service, and wherein the first user profile and the second user profile are accessed based on determining that the first user profile and the second user profile are associated with one or more additional services that are similar to the service.

4. The system of claim 1, wherein the first user profile, the second user profile, and the inferred user profile are associated with a user identifier associated with the user, and wherein the request comprises the user identifier, wherein the user identifier is determined by an identity provider based on receiving authentication credentials associated with the user.

5. The system of claim 1, wherein determining the first accuracy confidence level for the first attribute and the second accuracy confidence level for the second attribute further comprises determining whether the user has confirmed or validated the first attribute or the second attribute.

6. The system of claim 1, wherein determining the first accuracy confidence level for the first attribute and the second accuracy confidence level for the second attribute further comprises evaluating public information pertaining to a location of the user.

7. The system of claim 1, wherein the set of operations further comprising:
   presenting a plurality of checkboxes with corresponding user profiles; and
   receiving an indication via one or more of the plurality of checkboxes to update an attribute of at least one user profile based on updated user information.

8. A method for generating inferred user profiles, the method comprising:
   accessing, from a profile store, a first user profile for a user and a second user profile for the user, wherein the first user profile is associated with a first user context and the second user profile is associated with a second user context, wherein a context corresponds to a persona of a user profile;
   receiving, from a computing device based on a new user registration, a request for an inferred user profile associated with the user, wherein the new user registration is associated with a third user context;
   determining a first accuracy confidence level for a first attribute of the first user profile and a second accuracy confidence level for a second attribute of the second user profile, wherein the first attribute and the second attribute are of a first attribute type, wherein determining the first accuracy confidence level for the first attribute and the second accuracy confidence level for the second attribute further comprises evaluating publicly available contact information of the user;
   selecting the first attribute over the second attribute for the inferred user profile based on comparing the first user context, the second user context, and the third user context and in response to determining that the first accuracy confidence level for the first attribute is higher than the second accuracy confidence level for the second attribute; and
   providing, in response to the received request, the inferred user profile for creating a new user profile for the user.

9. The method of claim 8, wherein the request for the inferred user profile is associated with a service, and wherein the first user profile and the second user profile are determined based at least in part on the first user profile and the second user profile being associated with one or more services that are similar to the service.

10. The method of claim 8, wherein the first user profile, the second user profile, and the inferred user profile are associated with a user identifier associated with the user, and wherein the request comprises the user identifier, wherein the user identifier is determined by an identity provider based on receiving authentication credentials associated with the user; and wherein providing the inferred user profile comprises identifying the inferred user profile based on an association of the inferred user profile with the user identifier.

11. The method of claim 8, wherein determining the first accuracy confidence level for the first attribute and the second accuracy confidence level for the second attribute further comprises determining whether the user has confirmed or validated the first attribute or the second attribute.

12. The method of claim 8, wherein determining the first accuracy confidence level for the first attribute and the second accuracy confidence level for the second attribute further comprises evaluating public information pertaining to a location of the user.

13. The method of claim 8, wherein the method further comprises:
   presenting a plurality of checkboxes with corresponding user profiles; and
   receiving an indication via one or more of the plurality of checkboxes to update an attribute of at least one user profile based on updated user information.

14. A method for generating inferred user profiles, the method comprising:
   accessing a first user profile and a second user profile from a profile store, wherein the first user profile and the second user profile are associated with a user, wherein the first user profile is associated with a first user context and the second user profile is associated with a second user context, wherein a context corresponds to a persona of a user profile;
   receiving, from a computing device, based on a new user registration, a request for an inferred user profile associated with the user, wherein the new user registration is associated with a third user context;
   determining a first accuracy confidence level for a first attribute of the first user profile and a second accuracy confidence level for a second attribute of the second user profile, wherein the first attribute and the second attribute are of a first attribute type, wherein determining the first accuracy confidence level for the first attribute and the second accuracy confidence level for the second attribute further comprises evaluating publicly available contact information of the user;
   selecting the first attribute over the second attribute for the inferred user profile based on comparing the first user context, the second user context, and the third user context and in response to determining that the first accuracy confidence level for the first attribute is higher than the second accuracy confidence level for the second attribute;
   providing, in response to the received request, the inferred user profile for creating a new user profile for the user;
   receiving an update to an inferred attribute of the inferred user profile, the update comprising updated user information for the user associated with an attribute type; and
   updating, based on the updated user information, at least one user profile.

15. The method of claim 14, wherein accessing the first user profile and the second user profile comprises identifying the first user profile and the second user profile from a plurality of user profiles based on determining that the first user profile and the second user profile are associated with a persona type.

16. The method of claim 14, wherein the first user profile and the second user profile are accessed based on determining that the first user profile and the second user profile are associated with similar services.

17. The method of claim 14, wherein the first user profile, the second user profile, and the inferred user profile are associated with a user identifier associated with the user, wherein the user identifier is determined by an identity provider based on receiving authentication credentials associated with the user.

18. The method of claim 14, wherein the method further comprises:
- presenting a plurality of checkboxes with corresponding user profiles; and
- receiving an indication via one or more of the plurality of checkboxes to update an attribute of at least one user profile based on updated user information.

19. The method of claim 14, wherein determining the first accuracy confidence level for the first attribute and the second accuracy confidence level for the second attribute further comprises determining whether the user has confirmed or validated the first attribute or the second attribute.

20. The method of claim 14, wherein the at least one user profile is associated with a persona type.

* * * * *